(12) United States Patent
Allen

(10) Patent No.: US 7,972,672 B2
(45) Date of Patent: Jul. 5, 2011

(54) LAMINATED ANTI-FATIGUE AREA RUG AND METHOD OF MANUFACTURE

(76) Inventor: Jason Allen, Victoria (CA)

(\*) Notice: Subject to any disclaimer, the term of this patent is extended or adjusted under 35 U.S.C. 154(b) by 1032 days.

(21) Appl. No.: 11/678,591

(22) Filed: Feb. 24, 2007

(65) Prior Publication Data

US 2008/0206507 A1    Aug. 28, 2008

(51) Int. Cl.
*B32B 3/06* (2006.01)
(52) U.S. Cl. .............. 428/53; 428/57; 428/58; 428/455
(58) Field of Classification Search .................... 428/53, 428/57, 58, 455
See application file for complete search history.

(56) References Cited

U.S. PATENT DOCUMENTS

| 692,029 | A | * | 1/1902 | Philipps | 428/33 |
| 762,492 | A | * | 6/1904 | Philipps | 442/86 |
| 816,388 | A | * | 3/1906 | Sechiari | 474/271 |
| 4,347,272 | A | * | 8/1982 | Schmidt | 428/40.6 |
| 4,420,351 | A | * | 12/1983 | Lussi et al. | 156/62.4 |
| 4,743,510 | A | * | 5/1988 | Nemeth | 428/455 |

FOREIGN PATENT DOCUMENTS

| JP | 07024948 A | * | 1/1995 |
| JP | 2002326313 A | * | 11/2002 |

\* cited by examiner

*Primary Examiner* — Elizabeth M Cole
(74) *Attorney, Agent, or Firm* — Gordon Thomson

(57) ABSTRACT

A laminated anti-fatigue area rug comprises a bottom laminate of anti-fatigue material being rubber or vinyl having anti-slip properties for stability, a top laminate of cork with an upper wearing surface having a polyurethane coating and a middle bonding laminate of fiberglass cloth and adhesive material to bond the layers together. There resulting rug is sufficiently flexible that it may be rolled for storage without cracking the cork or delaminating.

1 Claim, 12 Drawing Sheets

28

32

32

46

50

52

LAMINATED ANTI-FATIGUE AREA RUG AND METHOD OF MANUFACTURE

BACKGROUND OF THE INVENTION

1. Field of the Invention

This invention relates to the field of laminated materials and more particularly to a laminated anti-fatigue rug.

2. Discussion of the Prior Art

Anti-fatigue carpets are well known in industry and commercial applications where they reduce leg and back fatigue from standing over long periods of time. Such rugs tend to be rubber or vinyl and do not possess aesthetic qualities that make them suitable for residential use. As well, the use of rubber and vinyl products to produce a cushioning effect is detrimental to the environment when compared to other materials that have not heretofore been used in such applications. Cork is one such material. The benefits are using cork as a floor covering include the following:

- Cork trees are stripped of their bark every 9 to 14 years, never cut, ensuring that its habitat remains undisturbed. Hence cork is an environmentally benign material.
- The natural structure and chemical composition of Cork contribute to its beneficial properties: insulation, resiliency, impermeability, durability and hypoallergenic and fire retardant tendencies.
- 90% of cork tissue is gaseous; hence its density is extremely low, supporting great insulation—thermal and acoustic.
- When cork is subjected to pressure, the gas in the cells is compressed and volume reduces considerably. When released from pressure, cork recovers very rapidly to its original shape.
- The presence of Suberin, an intrinsic waxy substance, renders cork impervious to both liquid and gas. As a result, it will not rot and is considered the best seal available.
- Cork does not absorb dust, and consequently does not cause or contribute to allergies.
- Cork is remarkably resilient. It is less affected by impact and friction than any other hard surface because of its cellular composition.
- Cork is a natural fire retardant. It does not release toxic gases during combustion thus flames will not spread.
- Maintenance is nominal.

However, most floor covering applications using cork are rigid flooring laminates that cannot be easily rolled up and stored like a cloth or synthetic carpet.

Therefore, there is a need for an anti-fatigue rug that has good aesthetics, is made from environmentally sound materials and can be rolled for storage.

OBJECTS OF THE INVENTION

It is an object of the present invention to overcome the deficiencies noted in the prior art.

It is a further object of the present invention to provide an improved anti-fatigue rug that is of more ecologically sound construction.

It is still another object of the present invention to provide an anti-fatigue rug made from cork that can be rolled and stored like a carpet.

SUMMARY

In one embodiment of the invention there is provided a laminated anti-fatigue area rug comprising a bottom laminate of anti-fatigue material having an upper bonding surface and a lower contact surface having anti-slip properties for stability. The invention further comprises a top laminate of cork having a lower bonding surface and an upper wearing surface having a transparent polyurethane coating. The invention still further comprises a middle bonding laminate to bond the top layer to the bottom layer.

In another embodiment of the invention the upper wearing surface may have a decorative pattern.

The resulting laminated rug is sufficiently pliable so that it may be rolled without resulting in de-lamination or cracking of any laminate.

In one embodiment of the invention the bottom laminate comprises anti-fatigue rubber the composition of which is well known in the art of about 7 mm although this may vary to suit varies environmental conditions of use. The rubber can be natural or synthetic such as nitrile rubber or styrene-butadiene rubber (SBR).

In another embodiment of the invention the bottom laminate is anti-fatigue vinyl foam the composition of which is also well known in the art having a thickness of about 7 mm depending upon environmental conditions use.

In yet another embodiment of the invention the top laminate is cork comprising a single sheet of cork.

In another embodiment of the invention the cork laminate may be constructed from cork strips or tiles.

In still another embodiment of the invention the middle bonding laminate comprises bonding material adapted to provide structural strength to the rug and having anti-puncture characteristics.

In a preferred embodiment of the invention, the bonding material comprises reinforcement fiberglass tissue.

In another embodiment of the invention the bonding material comprises reinforcement fiberglass roving.

In one embodiment of the invention adhesive material is placed on the top and the bottom surfaces of the bonding material.

The constructed rug has a peripheral edge which may be reinforced by carpet serging or a strip of cork.

A method of manufacturing a laminated anti-fatigue area rug comprises the steps of:

a. forming the bottom laminate having a predetermined size from anti-fatigue material;
b. forming the top laminate having said predetermined size;
c. applying the middle bonding laminate to the lower bonding surface of the top laminate using an adhesive;
d. placing the upper bonding surface of the top laminate into contact with the middle bonding laminate;
e. trimming the peripheral edge so that it is clean; and,
f. fixing edging to the peripheral edge.

The method further comprises the step of providing a decorative pattern within the upper wearing surface of the top laminate.

BRIEF DESCRIPTION OF THE DRAWINGS

The foregoing and other objects, features and advantages of the invention will be apparent from the following more particular description of the preferred embodiments of the invention as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
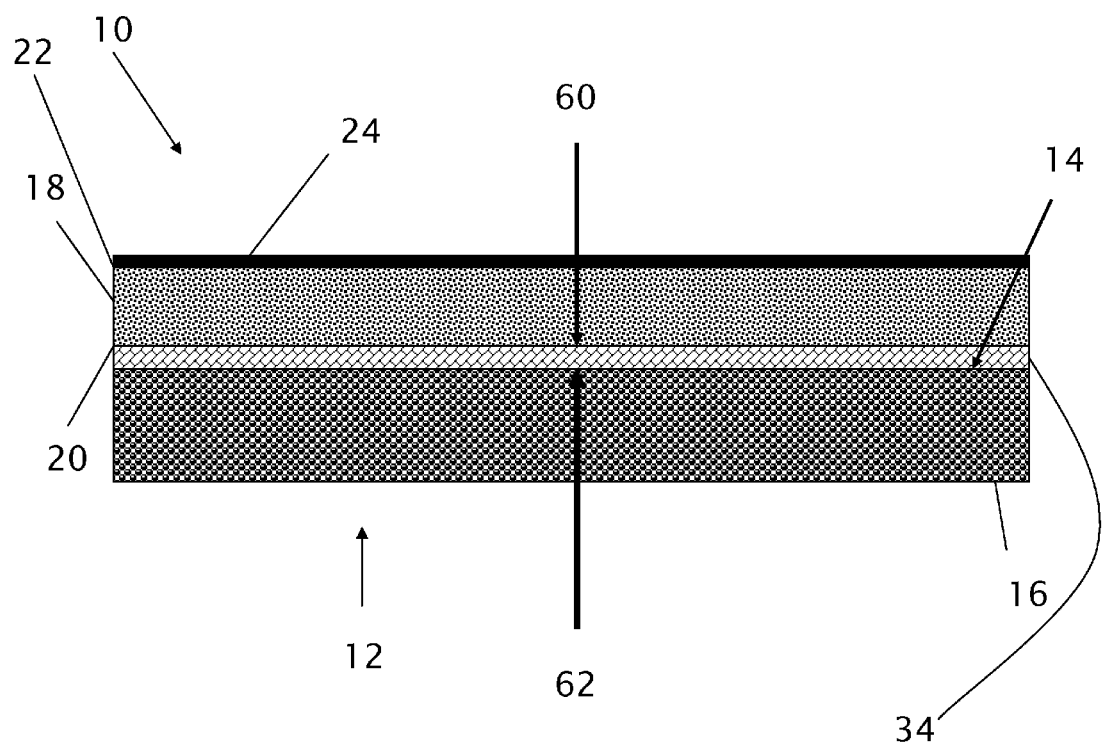
FIG. 1 is a representation of one embodiment of my invention.
Figure 2:
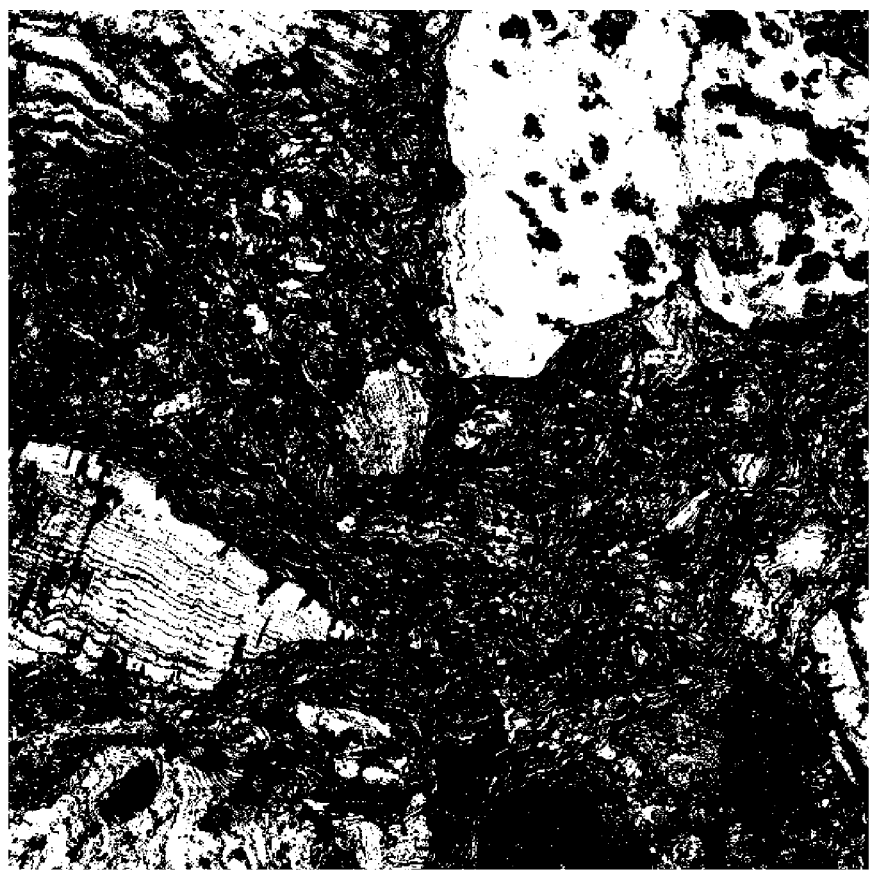
FIG. 2 is a representation of a natural cork pattern that may be used in one embodiment of my invention.
Figure 3:
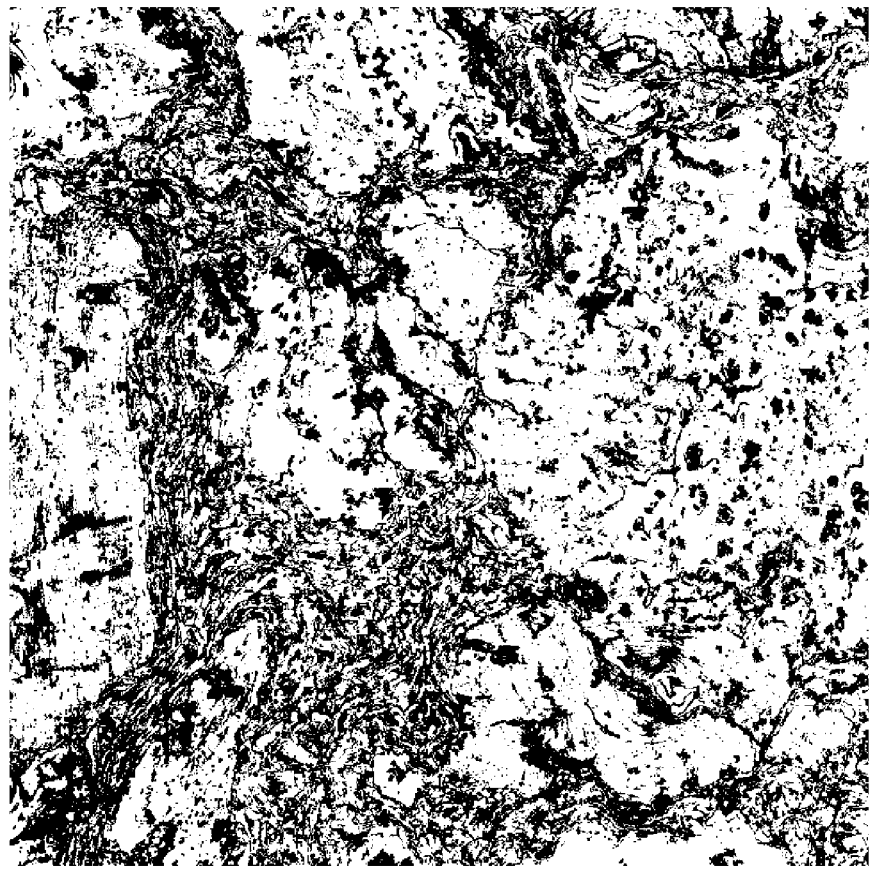
FIG. 3 is a representation of another natural cork pattern that may be used in one embodiment of my invention.
Figure 4:
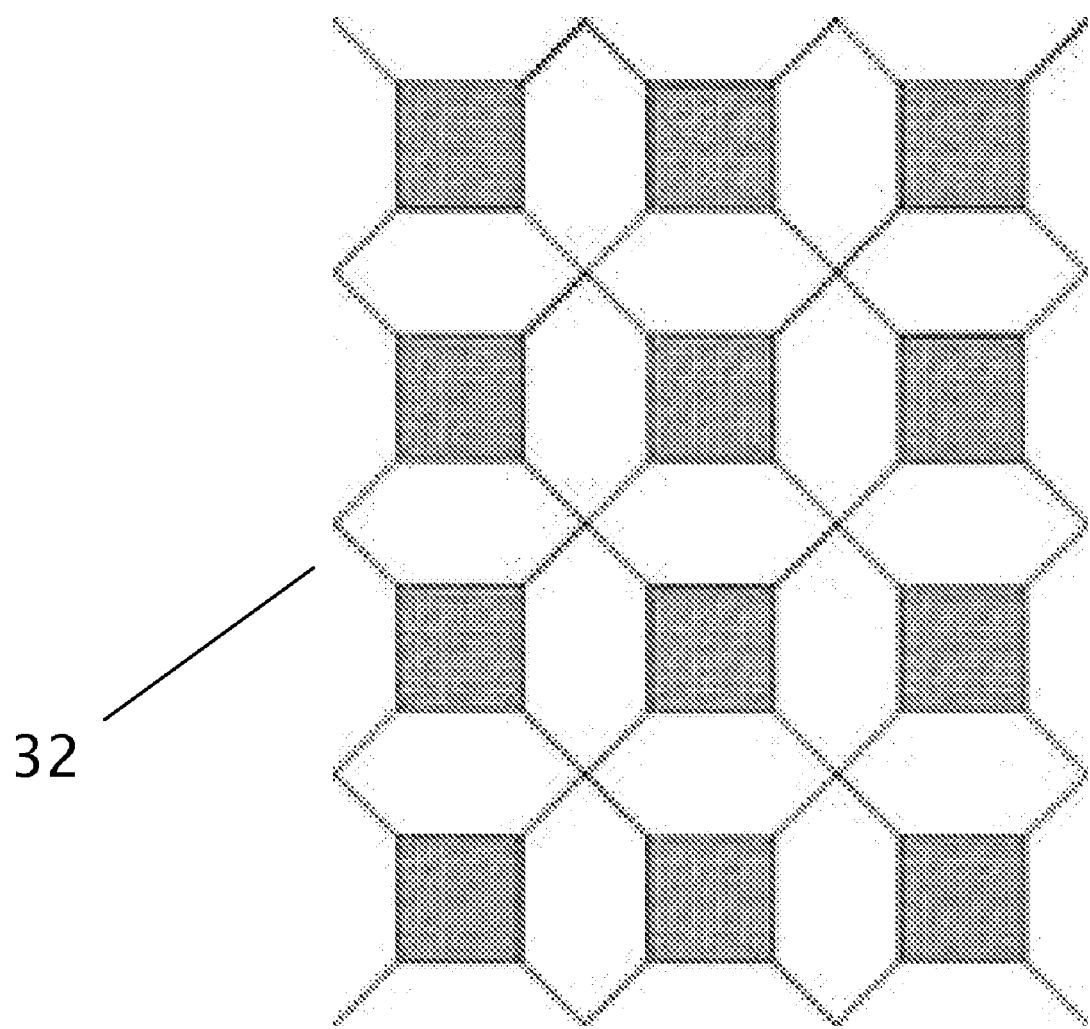
FIG. 4 is a representation of a human designed pattern that may be used on one embodiment of my invention.
Figure 5:
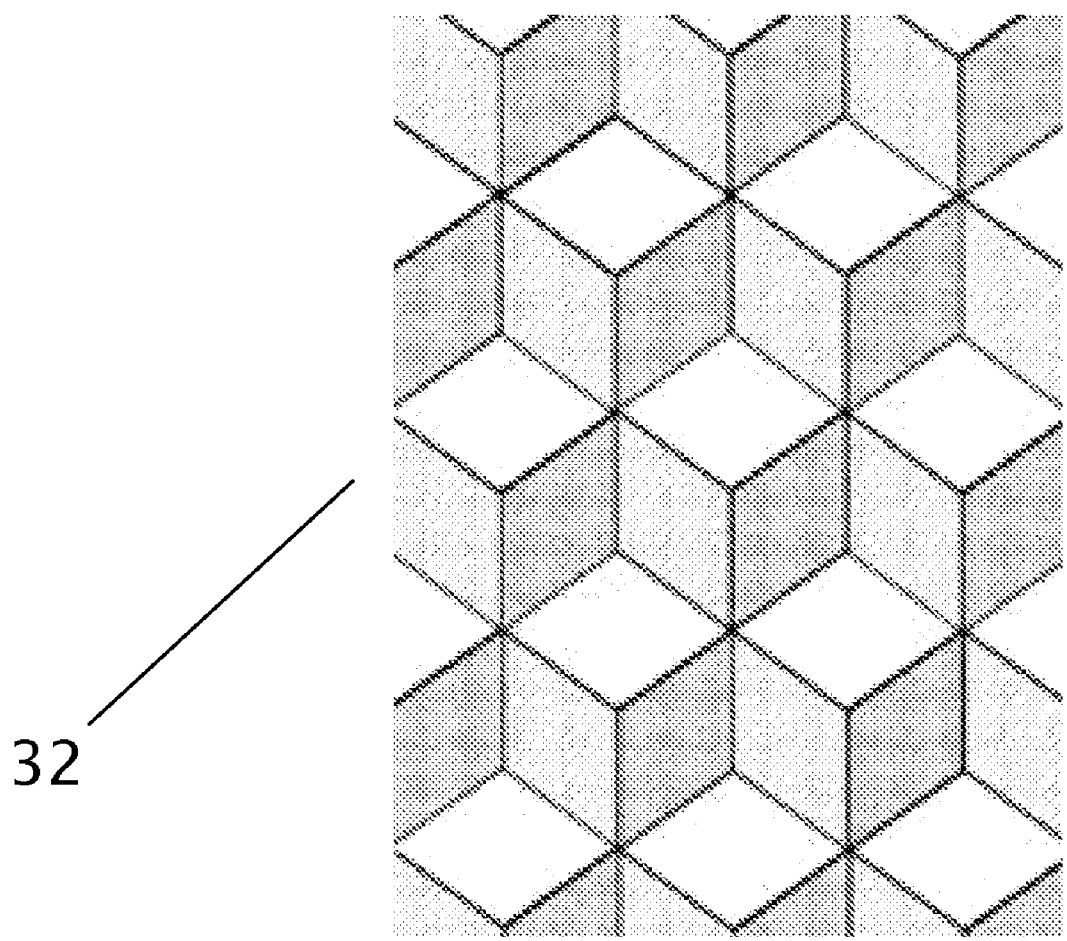
FIG. 5 is a representation of another human designed pattern that may be used on one embodiment of my invention.

Referring to FIG. 1, my invention (10) is a laminated anti-fatigue area rug comprising a bottom laminate of anti-fatigue material (12) having an upper bonding surface (14) and a lower contact surface (16) having anti-slip properties for stability. My invention further comprises a top laminate (18) of cork having a lower bonding surface (20) and an upper wearing surface (22) having a transparent polyurethane coating (24). The upper wearing surface (22) may have a decorative pattern (26 & 28) as illustrated in FIGS. 2 and 3 wherein the pattern is a natural cork pattern. As illustrated in FIGS. 4 and 5 the pattern can be human designed (30 & 32).

Still referring to FIG. 1, there further included a middle bonding laminate (34) adapted to bond the top layer to the bottom layer.

The laminated cork rug of my invention is sufficiently pliable so that it may be rolled without resulting in de-lamination or cracking of any laminate.

Figure 6:
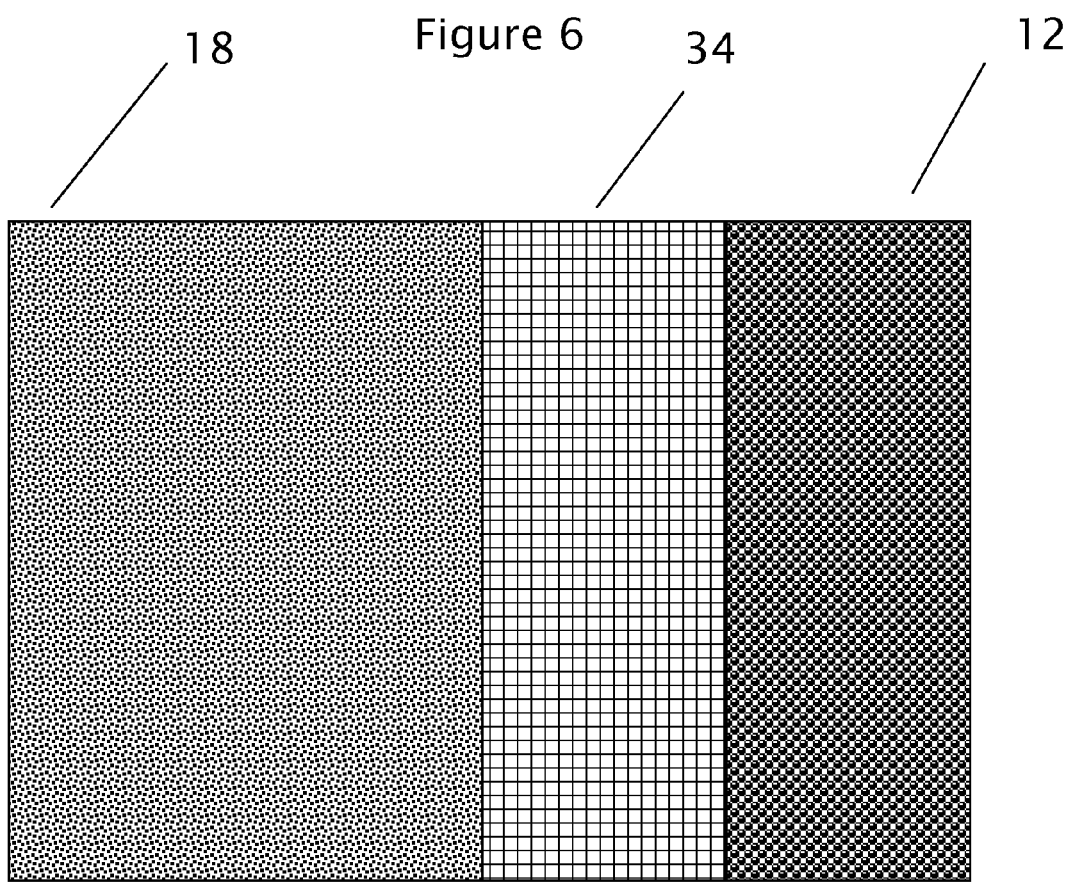
FIG. 6 is a representation of the laminates of one embodiment of my invention.

Referring to FIG. 6, my invention is shown in a cut-away format with the upper surfaces of the laminates exposed. The bottom laminate (12) comprises anti-fatigue rubber the composition of which is well known in the art. Generally the thickness of the bottom laminate is about 7 mm although this may vary to suit varies environmental conditions of use. Rubber is recommended for commercial or industrial use because of its durable wear. Alternatively, the bottom laminate comprises anti-fatigue vinyl foam the composition of which is also well known in the art. The thickness of the vinyl form is also of about 7 mm depending upon environmental conditions use. Vinyl foam is recommended for residential use because it gives the rug a softer feel. Both the rubber and vinyl bottom laminates are selected for their anti-slip characteristics and their ability to enhance the stability of the construction of the rug. The rubber used is synthetic rubber such as styrene-butadiene rubber (BSR) or nitrile rubber. The rubber laminate has a textured bottom surface (16) for anti-slip resistance.

Figure 7:
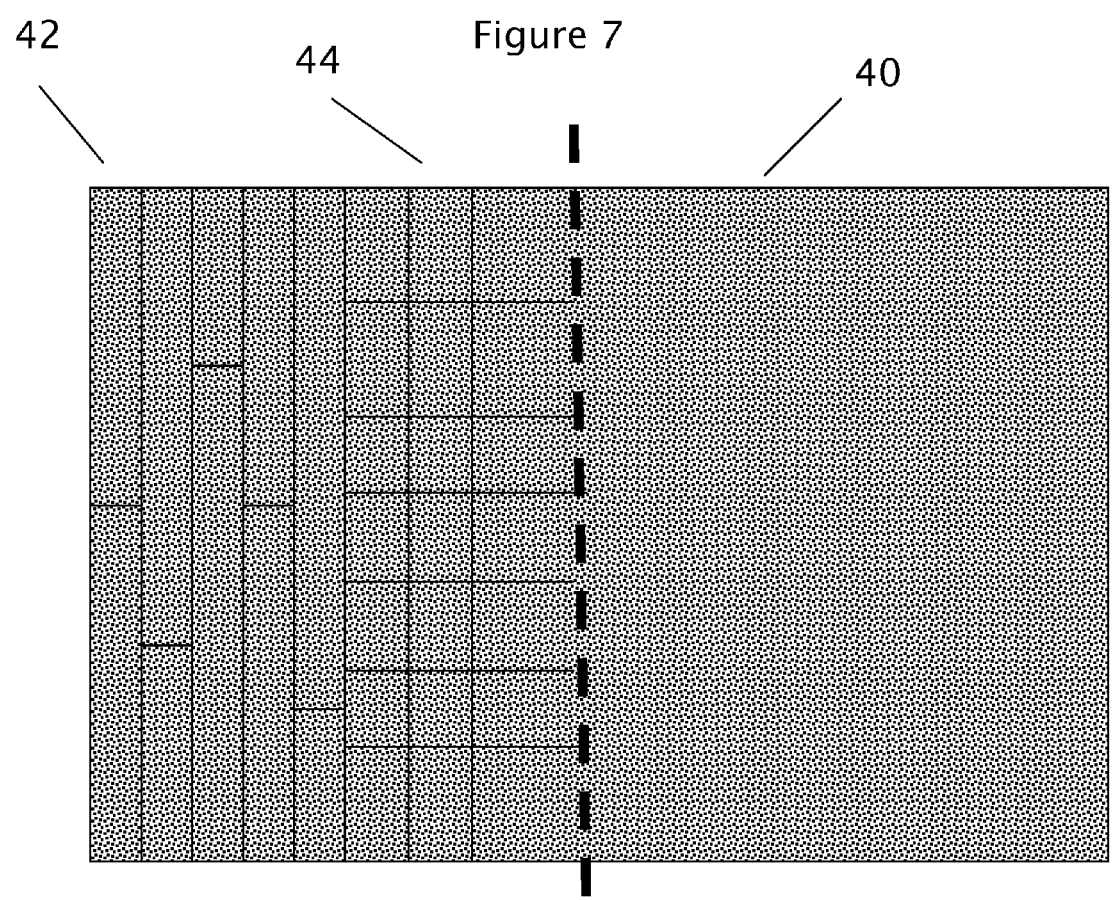
FIG. 7 is a representation of the surface patterns possible on one embodiment of my invention.
Figure 8:
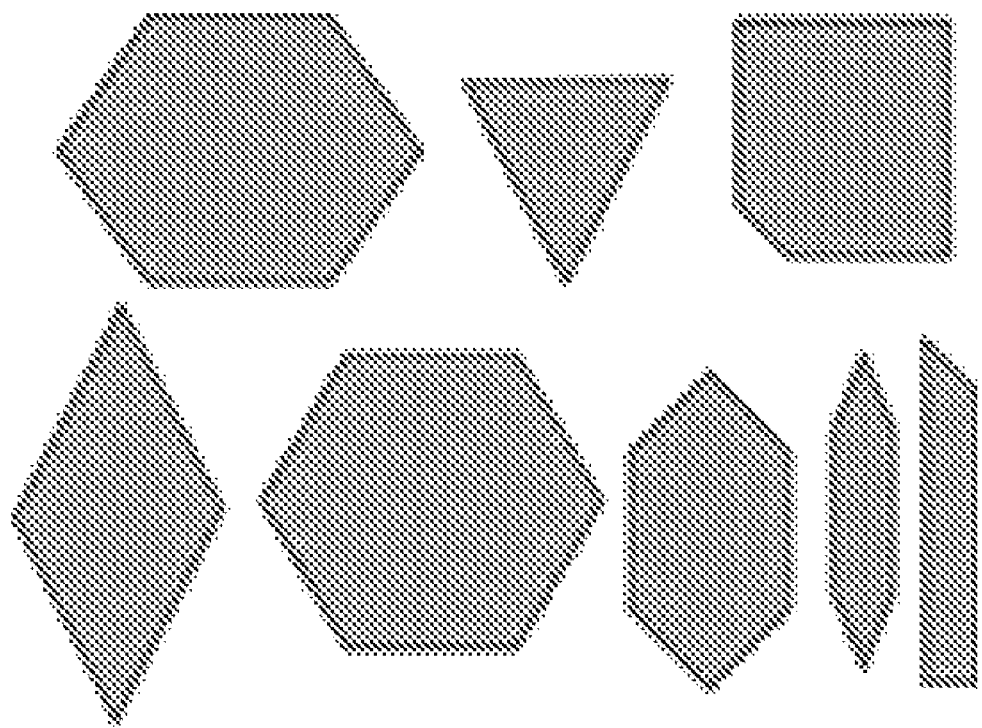
FIG. 8 illustrates the patterns of cork tiles than can be used to create human designs in one embodiment of my invention.

Referring to FIG. 7, the top laminate of cork may be is comprised of a single sheet of cork (40). In another embodiment of the invention, the top laminate of cork may be comprised of a plurality cork strips (42). In yet another embodiment of the invention the top laminate of cork may be comprised of rectangular cork tiles (44) joined together by joining means. Patterns can be applied to the cork surface. Typically a human-designed pattern as illustrated in FIGS. 4 & 5 is applied using a mosaic of a plurality of individual cork tiles of various shapes (46) as illustrated in FIG. 8.

Figure 9:
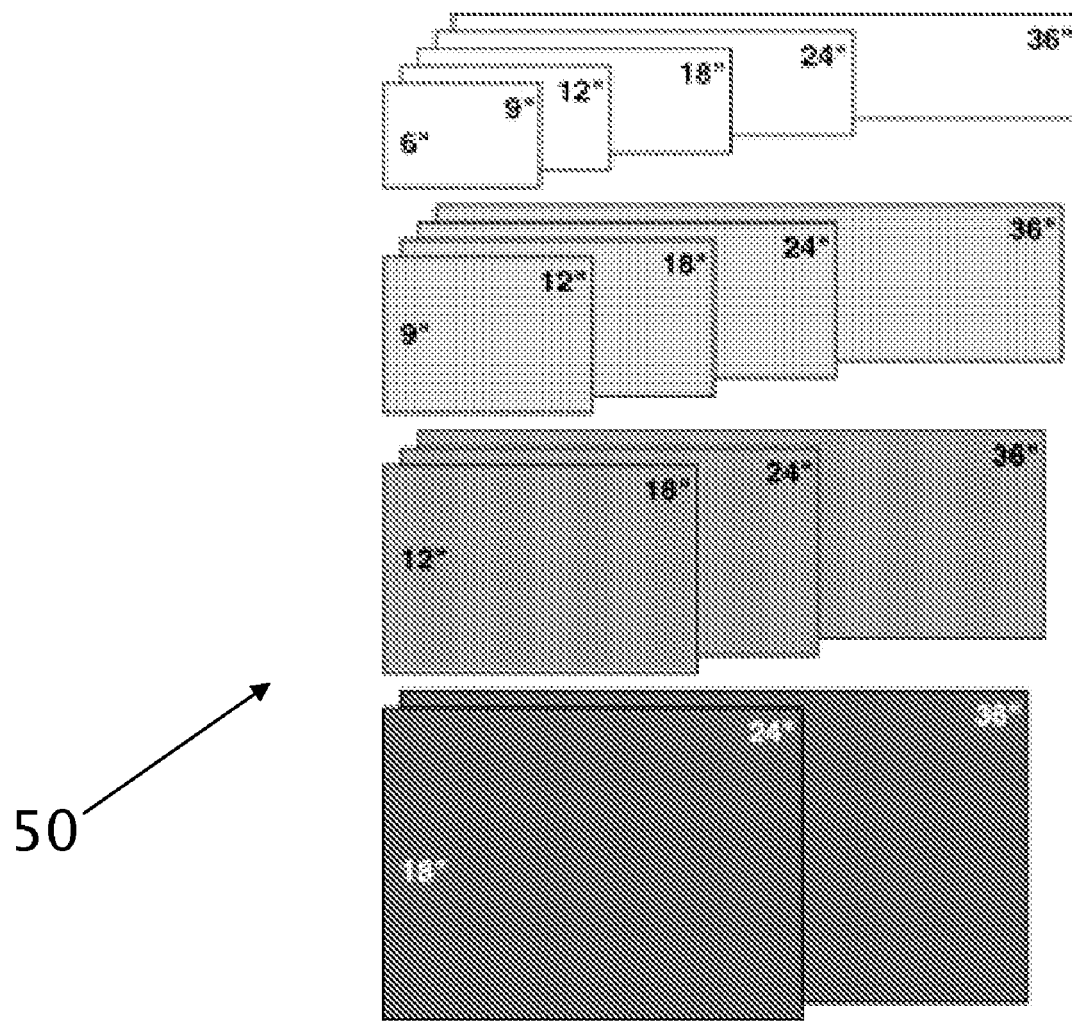
FIG. 9 illustrates the sizes and dimensions of rectangular cork tiles that may be used in one embodiment of my invention.

Referring to FIG. 9, cork strips are available in a variety of sizes to create the desired visual effect.

Figure 10:
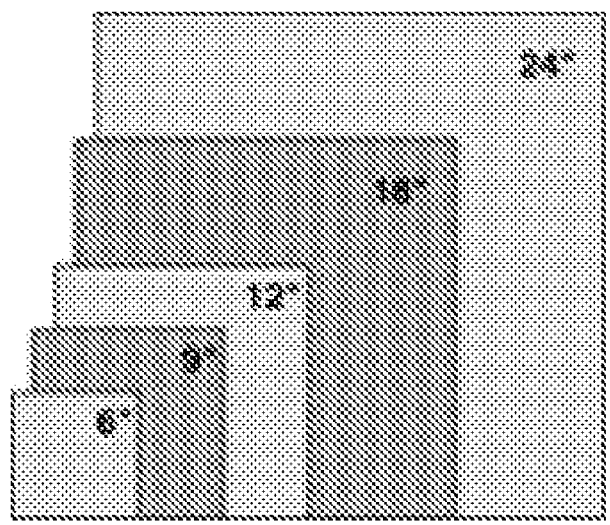
FIG. 10 illustrates the sizes and dimensions of square cork tiles that may be used on one embodiment of my invention.
Figure 10:
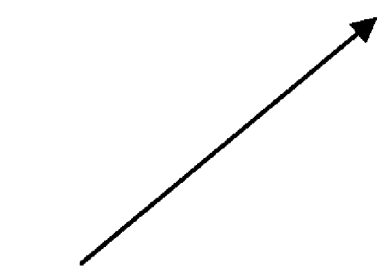

Referring to FIG. 10, cork tiles are also available in a variety of sizes to create the desired visual effect.

When tiles are used as illustrated in FIG. 10 with the effect shown in FIG. 7, Item 44, the tiles are joined by joining means comprising a first bead of contact cement placed on a first edge of a first rectangular cork tile of and a second bead of contact cement placed on a second adjoining edge of a second rectangular cork tile. When the tiles are joined a seam is formed between them. The seam is covered by a strip of thin fiberglass tape and then the strip of thin fiberglass tape is sealed with a coat of sealant.

Referring to FIG. 1 and FIG. 6, the middle bonding laminate (34) comprises bonding material adapted to provide structural strength to the rug and having anti-puncture characteristics. In a preferred embodiment of the invention, the bonding material comprises reinforcement fiberglass tissue. In another embodiment of the invention the bonding material comprises reinforcement fiberglass roving. Adhesive material is placed on the top (60) and the bottom (62) surfaces of the bonding material. In one embodiment of the invention the adhesive material is contact cement. In the preferred embodiment, the contact cement is environmentally benign having a water base. In another embodiment of the invention where a rubber latex bottom laminate is used, the appropriate bonding material is latex-based cement.

Figure 11:
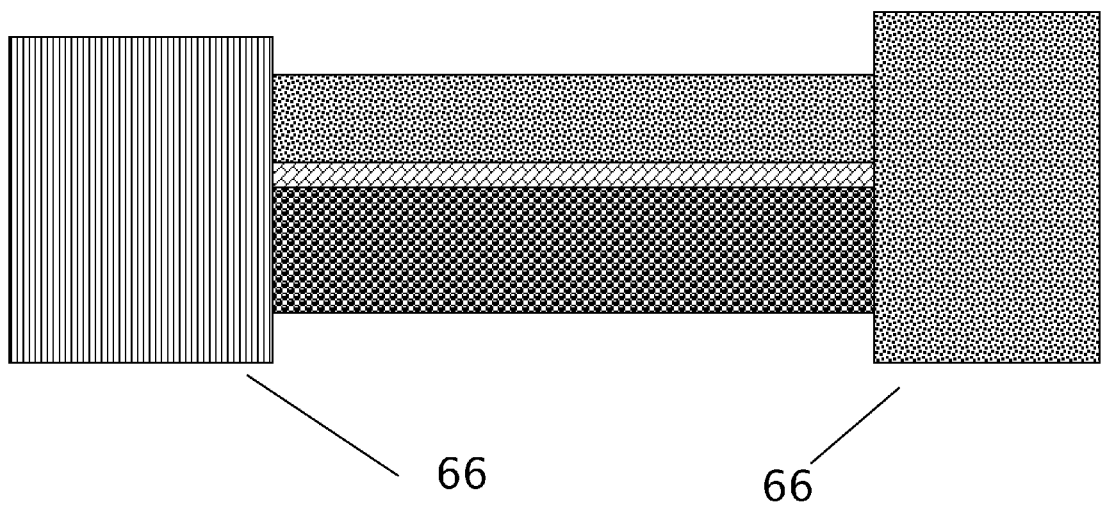
FIG. 11 is an illustration of one embodiment of my invention with a reinforcing strip along its peripheral edge.
Figure 12:
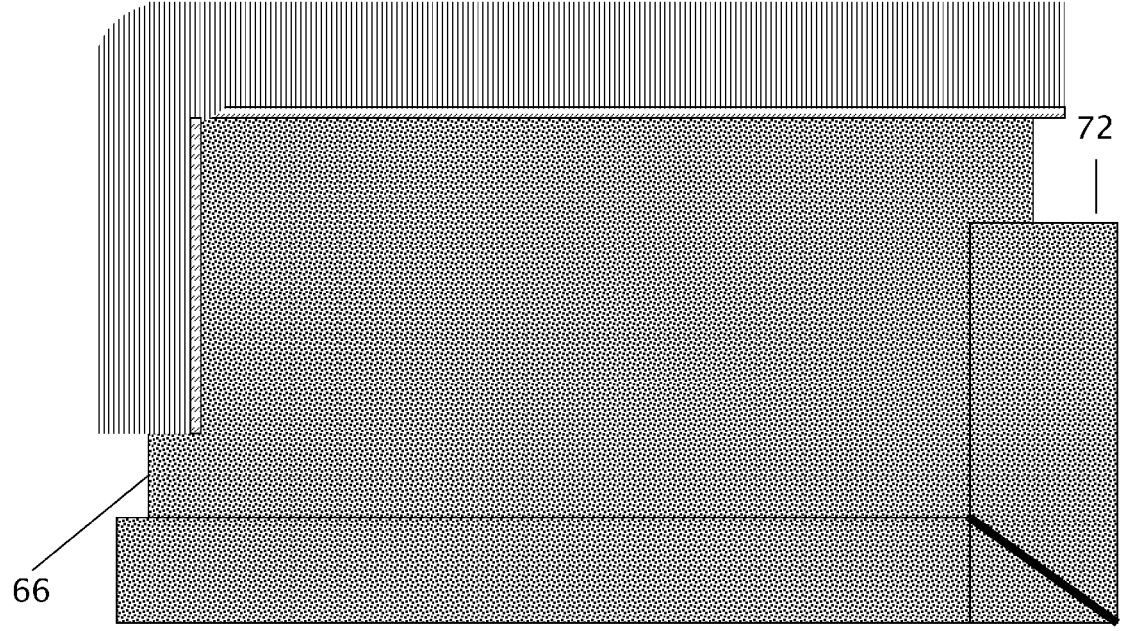
FIG. 12 is an illustration of one embodiment of my invention using carpet serging or cork stripping to reinforce the edge of the rug.

Referring to FIG. 11 and FIG. 12, my rug (10) includes a peripheral edge (66) that is reinforced by edging (68). In one embodiment of the invention the edging is carpet serging (70). In another embodiment of the invention the edging is a strip of cork (72).

A method of manufacturing a laminated anti-fatigue area rug comprising a bottom laminate of anti-fatigue material having an upper bonding surface and a lower contact surface having anti-slip properties for stability; a top laminate of cork having a lower bonding surface and an upper wearing surface coated with a polyurethane coating; a middle bonding laminate adapted to bond the top layer to the bottom layer; and, a peripheral edge; comprises the steps of:

a. forming the bottom laminate having a predetermined size from anti-fatigue material;
b. forming the top laminate having said predetermined size;
c. applying the middle bonding laminate to the lower bonding surface of the top laminate using an adhesive;
d. placing the upper bonding surface of the top laminate into contact with the middle bonding laminate;
e. trimming the peripheral edge so that it is clean; and,
f. fixing edging to the peripheral edge.

The method further comprises the step of providing a decorative pattern within the upper wearing surface of the top laminate.

Although the description above contains much specificity, these should not be construed as limiting the scope of the invention but as merely providing illustrations of some of the presently preferred embodiments of this invention. Thus the scope of the invention should be determined by the appended claims and their legal equivalents.

What is claimed is:

1. A laminated anti-fatigue area rug comprising:
   a. a bottom laminate of anti-fatigue material selected from the group consisting of one of styrene-butadiene rubber and nitrile rubber, said bottom laminate having an upper bonding surface and a lower contact surface having anti-slip properties for stability;

b. a top laminate comprising a plurality of rectangular cork tiles joined together by joining means, said to top laminate having a lower bonding surface and an upper wearing surface having a polyurethane coating, wherein said upper wearing surface comprises a decorative pattern selected from the group consisting of one of a natural cork pattern and a human-designed pattern comprising a mosaic of a plurality of individual cork tiles;

c. a middle fibre glass bonding laminate having an upper contact surface and a lower contact surface for strengthening the rug, for providing puncture resistance to the rug and for receiving a chemical adhesive for bonding said top laminate to said bottom laminate;

d. wherein said laminated rug is sufficiently pliable that it can be rolled without resulting in de-lamination or cracking of any laminate; and, wherein said joining means comprises a first bead of contact cement placed on a first edge of a first rectangular cork tile of said plurality of tiles and a second bead of contact cement placed on a second adjoining edge of a second rectangular cork tile of said plurality of tiles, so that when said first and second tiles are joined a seam is formed between them, and wherein said seem is covered by a strip of thin fiberglass tape, and further wherein said strip of thin fiberglass tape is sealed with a coat of sealant.

\* \* \* \* \*